United States Patent

Nagano et al.

[11] Patent Number: 5,739,827
[45] Date of Patent: Apr. 14, 1998

[54] IMAGE PROCESSING METHOD AND APPARATUS

[75] Inventors: Mamoru Nagano, Yokohama; Yoshiko Kobari, Kawasaki; Hiroyuki Namiki; Shigeki Koyama, both of Yokohama, all of Japan

[73] Assignee: Canon Kabushiki Kaisha, Tokyo, Japan

[21] Appl. No.: 587,660

[22] Filed: Jan. 17, 1996

[30] Foreign Application Priority Data

Jan. 19, 1995 [JP] Japan .................... 7-006462

[51] Int. Cl.$^6$ .................................... G06T 11/00
[52] U.S. Cl. .................... 345/473; 345/348
[58] Field of Search .................... 395/133, 339, 395/348, 333; 345/473, 333, 348, 349

[56] References Cited

U.S. PATENT DOCUMENTS

| | | | |
|---|---|---|---|
| 5,392,388 | 2/1995 | Gibson | 395/339 |
| 5,584,035 | 12/1996 | Duggan et al. | 395/133 |
| 5,611,031 | 3/1997 | Hertzfeld et al. | 395/133 |

*Primary Examiner*—Phu K. Nguyen
*Assistant Examiner*—Cliff N. Vo
*Attorney, Agent, or Firm*—Fitzpatrick, Cella, Harper & Scinto

[57] ABSTRACT

An image process is performed using a computer, without needing any special knowledge by a user. First, when a picture on a screen is designated and inputted by an input unit, a check is made to determine if an input figure name corresponding to the input figure is defined in a first table stored in a memory. When it is judged that the input figure name is defined, a setting method of a value of a variable in the first table is determined. On the basis of the determined setting method, the value is set into the variable shown by the variable name in the first table. A check is made to determine if a figure shown by a connected figure name which is defined in a second table stored in the same memory as that of the first table, and is interlocked with the variable shown by the variable name exists on a screen. When it is judged that such a figure exists, the figure shown by the connected figure name is edited and displayed on the basis of the display type in the second table.

16 Claims, 3 Drawing Sheets

| INPUT FIGURE NAME | PRESET VALUE | VARIABLE NAME | SETTING METHOD |
|---|---|---|---|
| START_KEY | 1 | START_VALUE | SET |
| . | . | . | . |
| . | . | . | . |

FIG. 4
| VARIABLE NAME | SCOPE OF VALUE | CONNECTED FIGURE NAME | PROCEDURE NAME | DISPLAY TYPE |
|---|---|---|---|---|
| START_VALUE | [0-1] | START_LAMP | | LAMP |
| . | . | . | | |
| . | . | . | | |
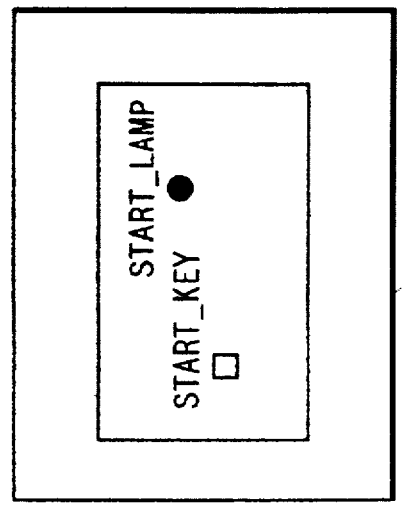
FIG. 5A
STEP 11~STEP 15
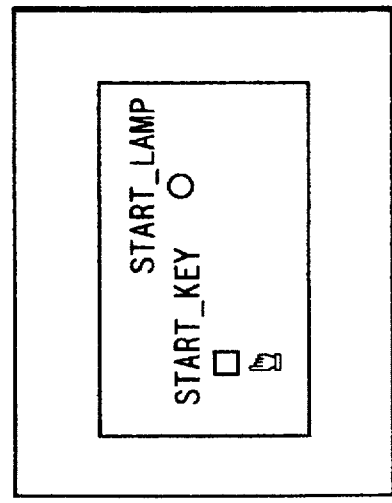
FIG. 5B

IMAGE PROCESSING METHOD AND APPARATUS

BACKGROUND OF THE INVENTION

1. Field of the Invention

The invention relates to an image processing method and apparatus controlled by a computer or the like.

2. Related Background Art

Hitherto, an image process (control) by a computer or the like has been performed by a high level language such as FORTRAN, C language, or the like or a machine language such as ASSEMBLER or the like.

When the image process (control) by a computer or the like is executed by the above conventional method, however, there is a drawback in that special knowledge is necessary and the image process is not easily performed.

SUMMARY OF THE INVENTION

The invention is made in consideration of the drawbacks of the conventional technique mentioned above and it is an object of the invention to provide an image processing method and apparatus which can easily perform an image process without needing any special knowledge.

According to one aspect of the invention, the above object is accomplished by an image processing method in an image processing apparatus having a first table in which a first screen display object, a variable, and a method of setting a value of the variable are defined and a second table in which a variable, a second screen display object interlocked with the value of the variable, and a method of editing the second screen display object are defined, wherein the method includes: an instructing step of instructing the first screen display object; a first deciding step of deciding the setting method of the value of the variable which was defined in the first table on the basis of an instruction in the instructing step; a setting step of setting the value of the variable on the basis of the decision result in the first deciding step; a second deciding step of deciding whether the second screen display object which was defined in the second table and is interlocked with the value of the variable set in the setting step exists on a screen or not; and an editing step of editing the second screen display object on the basis of the editing method defined in the second table in the case where it is decided in the second deciding step that the second screen display object exists on the screen.

According to another aspect of the invention, there is provided an image processing apparatus including: first memory means in which a first table in which a first screen display object, a variable, and a method of setting a value of the variable are defined has been stored; second memory means in which a second table in which a variable, a second screen display object interlocked with a value of the variable, and a method of editing the second screen display object are defined has been stored; display means for displaying a screen display object; instructing means for instructing the screen display object displayed on the display means; first deciding means for deciding the setting method of the value of the variable which was defined in the first table stored in the first memory means on the basis of an instruction by the instructing means; setting means for setting the value of the variable on the basis of the decision result by the first deciding means; second deciding means for deciding whether the second screen display object which was defined in the second table stored in the second memory means and is interlocked with the value of the variable set by the setting means exists on a screen or not; and editing means for editing the second screen display object on the basis of the editing method defined in the second table stored in the second memory means in the case where it is decided by the second deciding means that the second screen display object exists on the screen.

BRIEF DESCRIPTION OF THE DRAWINGS

FIG. 4 shows a description example of a table 2; and

FIGS. 5A and 5B are explanatory diagrams for changes on a display device.

DETAILED DESCRIPTION OF THE PREFERRED EMBODIMENTS

An embodiment of the invention is described in detail below with reference to the drawings.

Figure 1:
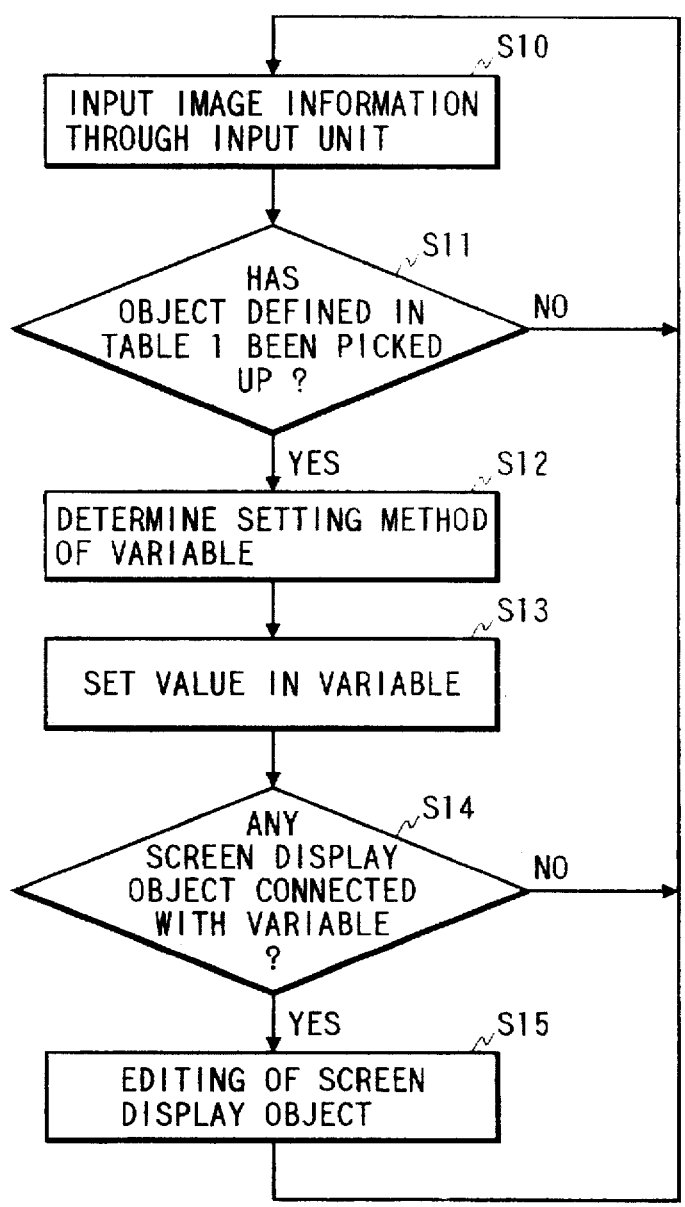
FIG. 1 is a flowchart for processes in an embodiment.
Figures 2, 3:
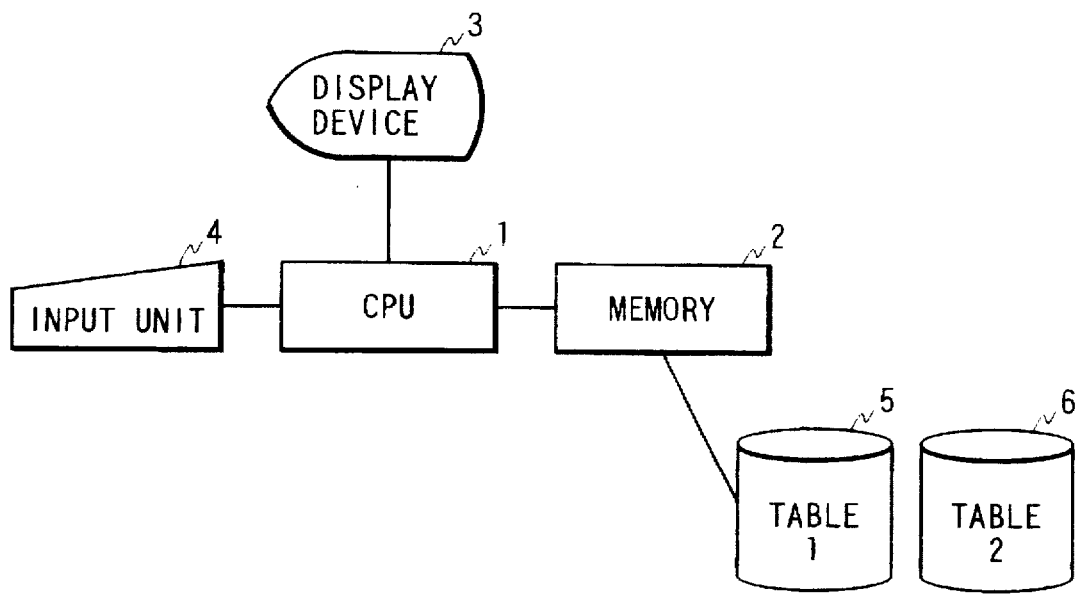
FIG. 2 is a system constructional diagram of the embodiment.
FIG. 3 shows a description example of a table 1.

FIG. 2 is a block diagram showing a construction of a system to which an image control system of the embodiment of the invention is applied. A main section of the system is constructed by: a central processing unit (CPU) 1 for controlling each unit in the system; a memory 2 for storing a program according to a flowchart shown in FIG. 1 and information such as images or the like inputted by an input unit 4; a display device 3 such as a CRT or the like to display the information stored in the memory 2; the input unit 4 for inputting information such an image or the like; further, a file 5 describing a table [hereinafter, referred to as a table 1] which defines an input figure, a variable, and its setting method formed in the memory 2; and a file 6 describing a table [hereinafter, referred to as a table 2] which defines a variable, its connected figure, and its display type.

FIG. 1 is the flowchart showing processes of the embodiment. FIG. 3 shows a description example of the table 1. FIG. 4 shows a description example of the table 2. FIGS. 5A and 5B are explanatory diagrams of changes on the display device.

Terminologies which are used in the description are described below.

SCREEN DISPLAY OBJECT

A figure (character or symbol can be also substituted) displayed on the display device 3. In FIGS. 5A and 5B, it corresponds to □ and ○ (●) drawn under characters of START_KEY and START_LAMP.

FIGURE NAME

One figure name is allocated to one screen display object on the display device 3. Figure names are stored in the memory 2. In FIG. 3, START_KEY is allocated as an input figure name. In FIG. 4, START_LAMP is allocated as a connected figure name.

VARIABLE NAME

It is stored in the memory 2 and is described in the third column from the left in the table 1 and is also described in the leftmost column in the table 2. In FIGS. 3 and 4, it corresponds to START_VALUE.

SETTING METHOD OF VALUE TO VARIABLE

It is described in the fourth column from the left in the table 1. In FIG. 3, it corresponds to SET. There are also COUNT_UP, COUNT_DOWN, and the like other than SET. SET indicates that the set value described at the second column from the left in the table 1 is substituted for the variable of the name described in the third column from the left in the table 1. COUNT_UP indicates that the set value is added to the value of the variable. COUNT_DOWN indicates that the set value is subtracted from the value of the variable.

CONNECTED FIGURE NAME

It is described in the third column from the left in the table 2 and is a figure name which is possessed by the screen display object in which a display state changes in accordance with a display type, which is described hereinlater, by a change in value of the variable name described in the same row. In FIGS. 5A and 5B, the connected figure name indicates START_LAMP.

DISPLAY TYPE

It is described in the fifth column from the left in the table 2. In FIG. 4, it indicates LAMP. According to the display type LAMP, when the value of the variable is set to "1", the screen display object having the connected figure name is lit and when the value of the variable is set to "0", the screen display object is turned off.

PROCEDURE NAME

It indicates a load module name of the screen control which is formed by a high level language or the like and is described after the row in which the variable name in the table 2 is described. When the value described in the second column from the left of the same row is equal to the value of the variable, the load module is executed.

SCOPE OF VALUE

It indicates a fluctuation range of the set value. A natural number in this range is used as a set value. In case of the table 2, the set value is equal to either one of "0" and "1". The set value is interlocked with the display type. When the set value is equal to "0", the display is turned off. When the set value is equal to "1", the display is lit.

The operation of the embodiment is described below with reference to FIG. 1 on the basis of those drawings and the terminologies.

First, in step S10, when a figure on the screen is designated and inputted by the input unit 4 represented by a mouse or a keyboard for inputting information, a check is subsequently made in step S11 to see if the input figure name corresponding to the input figure has been defined in the table 1 stored in the memory 2 such as a ROM or the like. When it is judged that the input figure name is defined, step S12 follows and the setting method of the value of the variable in the table 1 is determined. When it is judged that the input figure name is not defined, the process is finished. In step S13, a value is set into the variable shown by the variable name in the table 1 on the basis of the setting method determined. In step S14, a check is made to see if a figure shown by the connected figure name which is interlocked to the variable shown by the variable name and has been defined in the table 2 stored in the same memory 2 as that of the table 1 exists on the screen. When it is judged that such a figure exists, step S15 follows and the figure shown by the connected figure name is edited and displayed on the basis of the display type in the table 2. When it is judged that such a figure doesn't exist, the process is finished.

The invention is further described by using the description example of the table 1 in FIG. 3, the description example of the table 2 in FIG. 4, and the examples of changes on the display device in FIGS. 5A and 5B.

First, when the figure under START_KEY on the screen in FIGS. 5A and 5B is designated and inputted by the input unit 4, a check is made to see if the input figure name START_KEY corresponding to the figure has been defined in the table 1. In this case, since the input figure name START_KEY is defined, the value "1" is set into the variable shown by a variable name START_VALUE in the table 1 on the basis of the setting method SET of the value of the variable in the table 1. A check is made to see if the figure shown by the connected figure name START_LAMP interlocked with the variable shown by the variable name START_VALUE which has been defined in the table 2 exists on the screen. As will be obviously understood from FIGS. 5A and 5B, since the figure shown by the connected figure name START_LAMP exists on the screen, the figure under START_LAMP on the screen is lit and displayed on the basis of the display type LAMP in the table 2.

With the above method, the image process by the computer is easily performed without any special knowledge.

The invention is not limited to the construction shown in the embodiment. For example, the editing of the screen display object is not limited to the light on/off but can be also applied to other editing such as display/non-display or the like.

Instead of directly editing the screen display object, it is also possible to construct in a manner such that the procedure name in the table 2 is determined and a module formed by the high level language is called and activated and the screen display object is edited.

What is claimed is:

1. An image processing method in an image processing apparatus having a first table in which a first screen display object, and a variable corresponding to said first screen display object are stored, and a method of setting a value of said variable are defined and a second table in which said variable, a second screen display object interlocked with a value of said variable are stored, and an editing method of editing said second screen display object are defined, comprising:

a designating step of designating said first screen display object on a screen;

a first deciding step of deciding said method of setting the value of said variable which was defined in said first table on the basis of a designation step;

a setting step of setting the value of said variable on the basis of a decision result in said first deciding step;

a second deciding step of deciding whether said second screen display object, which was defined in said second table and is interlocked with the value of said variable set in said setting step, exists on the screen; and an editing step of editing said second screen display object on the basis of the editing method defined in said second table in a case where it is decided in said second deciding step that said second screen display object exits on the screen.

2. A method according to claim 1, wherein the instruction in said instructing step is an instruction by a pointing device.

3. A method according to claim 2, wherein said pointing device is a mouse.

4. A method according to claim 1, wherein said first screen display object is a figure.

5. A method according to claim 1, wherein said second screen display object is a figure.

6. A method according to claim 1, wherein the value of said variable is equal to 1 or 0.

7. A method according to claim 1, wherein the editing method of said second screen display object is that a display state of said second screen display object on the screen is changed on the basis of the value of said variable.

8. A method according to claim 1, wherein the editing method of said second screen display object is that said second screen display object is set to a display state or a non-display state on the screen on the basis of the value of said variable.

9. An image processing apparatus comprising:

first memory means in which a first table in which a first screen display object, a variable corresponding to said first screen display object, and a method of setting a value of said variable are defined has been stored;

second memory means in which a second table in which said variable, a second screen display object which is interlocked with a value of said variable, and an editing method of editing said second screen display object are defined has been stored;

display means for displaying a screen display object;

designating means for designating the screen display object displayed on said display means;

first deciding means for deciding the setting method of the value of said variable which was defined in said first table stored in said first memory means on the basis of a designation by said designating means;

setting means for setting the value of said variable on the basis of a decision result by said first deciding means;

second deciding means for deciding whether said second screen display object, which was defined in said second table stored in said second memory means and is interlocked with the value of said variable set by said setting means, exists on said display means; and editing means for editing said second screen display object on the basis of the editing method defined in said second table stored in said second memory means in a case where it is decided by said second deciding means that said second screen display object exits on said display means.

10. An apparatus according to claim 9, wherein said instructing means is an instruction by a pointing device.

11. An apparatus according to claim 10, wherein said pointing device is a mouse.

12. An apparatus according to claim 9, wherein said first screen display object is a figure.

13. An apparatus according to claim 9, wherein said second screen display object is a figure.

14. An apparatus according to claim 9, wherein the value of said variable is equal to 1 or 0.

15. An apparatus according to claim 9, wherein the editing method of said second screen display object is that a display state of said second screen display object on the screen is changed on the basis of the value of said variable.

16. An apparatus according to claim 9, wherein the editing method of said second screen display object is that said second screen display object is set to a display state or a non-display state on the screen on the basis of the value of said variable.

* * * * *

UNITED STATES PATENT AND TRADEMARK OFFICE
CERTIFICATE OF CORRECTION

PATENT NO. : 5,739,827

DATED : April 14, 1998

INVENTOR(S) : MAMORU NAGANO, ET AL.

It is certified that error appears in the above-identified patent and that said Letters Patent is hereby corrected as shown below:

COLUMN 2

Line 5, "the case" should read --a case--.

COLUMN 4

Line 51, "exits" should read --exists--.

COLUMN 6

Line 5, "exits" should read --exists--.

Signed and Sealed this

Tenth Day of November 1998

Attest:

BRUCE LEHMAN

Attesting Officer

Commissioner of Patents and Trademarks